Feb. 10, 1970

J. R. HAYNES 3,494,586

WELDING TORCH HOLDER

Filed May 1, 1968

INVENTOR.
JOHN R. HAYNES
BY
Head & Johnson
ATTORNEYS

Feb. 10, 1970   J. R. HAYNES   3,494,586
WELDING TORCH HOLDER
Filed May 1, 1968   2 Sheets-Sheet 2

INVENTOR.
JOHN R. HAYNES
BY
Head & Johnson
ATTORNEYS

# United States Patent Office 3,494,586
Patented Feb. 10, 1970

3,494,586
WELDING TORCH HOLDER
John R. Haynes, 2630 E. 15th Place,
Tulsa, Okla. 74104
Filed May 1, 1968, Ser. No. 725,799
Int. Cl. B25h *1/00;* B23K *37/00*
U.S. Cl. 248—295                                          4 Claims

ABSTRACT OF THE DISCLOSURE

A bracket adapted to support a welding torch including a swivel adapted to be attached to a supporting structure at one end a threaded bore provided at the other end a shaft engaging the threaded bore, an elongated bracket having bearing sleeves attached to each end, the bearing sleeves being mounted on the shaft member, a ring adapted to receive a welding torch attached to one end of the bracket and a hand wheel attached to one end of the threaded shaft so that when the shaft is rotated the welding torch may be raised or lowered.

BACKGROUND OF THE INVENTION

In using welding torches, specifically of the continuous wire fed type where accuracy of the weld requires a non-hand held torch, it is necessary to remove the torch from or into the workpiece quickly in order to stop the arc. It has been found that if this is not done with sufficient speed, the wire will continue to feed as the torch is removed, resulting in irregular and undesirable weld portions.

SUMMARY

Accordingly, it is an object of this invention to provide a welding torch holder preferably for the continuous wire fed type which retains the torch steadily relative to the workpieces and wherein it is desired to remove the torch from the work either to make adjustments or preparatory to new work, the torch is removed rapidly there into or away from to interrupt the continuous wire feeding process and the resulting weld arc.

It is a further object of this invention to provide a welding torch holder which within its relatively unitary and compact design, is capable of retaining the torch at a variety of positions using parts that are retained with the device.

DESCRIPTION OF THE PREFERRED EMBODIMENT

Figure 1:
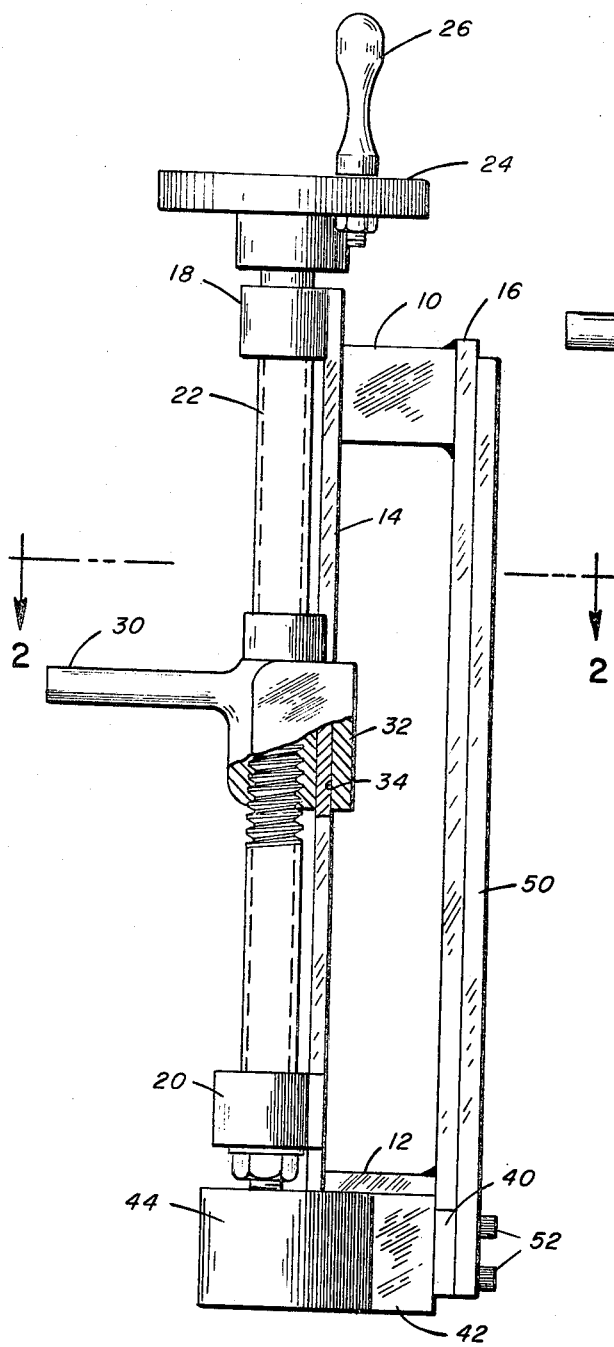
FIGURE 1 is a front elevational view of the apparatus of this invention.
Figure 2:
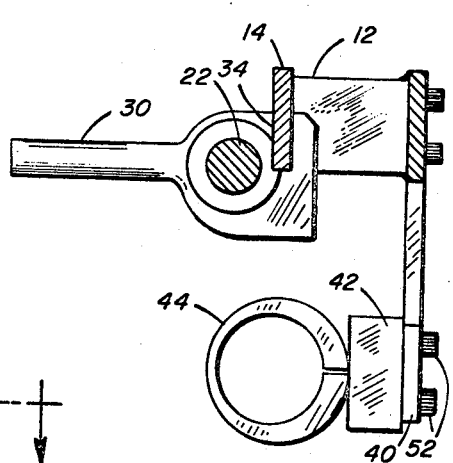
FIGURE 2 is a top sectional view taken along the line 2—2 of FIGURE 1.

Referring now to FIGURE 1, the torch holder of this invention basically comprises a unitary welded or bolted support frame having an upper portion 10 and lower portion 12, spaced and retained by vertical arms 14 and 16.

Figure 3:
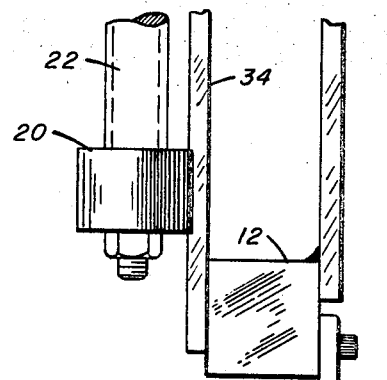
FIGURE 3 is a front elevational view showing the apparatus of this invention in a modified form.

Attached to vertical arm 14 are upper and lower sleeves 18 and 20 through which bearing portions of shaft 22 are rotatably retained. Preferably, shaft 22 includes twelve double lead V-threads or Acme threads. A crank 24 and hand knob 26 are attached to the threaded shaft 22 to cause rotation. A vertical traveling swivel holder 30 includes an internally threaded sleeve 32 matching the twelve double lead threads of shaft 22. A guide slot 34 is formed as a part of the sleeve 32 to provide further stability relative to vertical support member 14. At the lower end of support 12 and preferably below the vertical support 16 is a short arm bracket 40 to which a spacer block 42 may be used between arm 40 and the torch holding ring 44 which is adapted to clamp the torch used with this invention. A long arm bracket 50 is carried by the outer side of vertical support member 16, which in the position shown in FIGURE 1 is normally retained by set screws 52. As shown in FIGURE 3, this arm is utilized to provide an extension of vertical arm 16 or interchangeability with the short arm 40 for supporting the welding torch.

Figure 4:
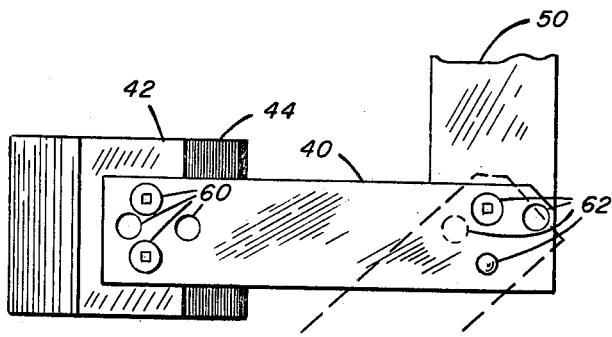
FIGURE 4 is a partial side view taken along the line 4—4 of FIGURE 1 and showing the variable position of the torch holding arm.

The short arm torch holding portion is best described in the partial side view of FIGURE 4. As such, the arm is adapted to be placed in a plurality of positions in angular relationships by the variety of openings 60 at one end and openings 62 at the other, one angular position of the short arm being shown in dotted line.

In operation the vertical swivel 30 is attached to any form of gantry or clamping means in the desired position. In some instances the swivel may be permanently attached as by welding to a fixture relative to the work where the type of work will remain relatively unchanged. A torch of the type described is clamped into ring 44 and by various adjustments of either swivel 30, long arm bracket 50 or short arm 40 is placed in proper position relative to the work. When it is desired to commence the welding operation, hand knob 26 is rotated and because of the fixed relationship of swivel nuts 30 and 32 the frames 10, 12, 14 and 16 are associated parts and torch moves rapidly into or out of the work to make or break the arc.

The invention has been described with reference to specific and preferred embodiments. It will be apparent, however, that other modifications can be made without departing from the spirit and scope of the invention.

What is claimed is:

1. An apparatus for holding a welding torch of the continuous wire fed squirt welding type comprising:
   a support portion having vertical arms thereof;
   a plurality of bearing sleeves attached to one arm so as to be aligned substantially vertically;
   a vertical threaded shaft rotatably positioned within said sleeves, said shaft having double lead threads; means to rotate said shaft;
   a swivel holder and guide nut sleeve internally threaded to match said threads of said shaft and adapted to be vertically movable relative to said vertical member, said swivel holder adapted to be maintained in a relatively fixed position whereupon rotation of said threaded shaft will vertically move said support portion;
   a short extension arm having means to releasably attach to the lower end of said support and including a torch holding ring at its other end;
   a long extension arm releasably attached at the same juncture point as said short arm and adaptable when removed to be reattached and act as an extension of said other vertical arm of said support and wherein said short arm may be releasably attached at an inoperative position.

2. An apparatus of claim 1 wherein said threads of said shaft are twelve double lead type threads.

3. An apparatus of claim 2 wherein said threads are V-threads.

4. An apparatus of claim 2 wherein said threads are Acme threads.

References Cited

UNITED STATES PATENTS

| | | | |
|---|---|---|---|
| 1,085,639 | 2/1914 | Snodgrass | 228—13 |
| 2,660,799 | 12/1953 | Strauss | 248—296 X |
| 2,753,425 | 7/1956 | Flood et al. | 219—125 |
| 2,991,966 | 7/1961 | Varel | 248—125 |
| 3,133,459 | 5/1964 | Worden | 228—13 |

ROY D. FRAZIER, Primary Examiner

J. FRANKLIN FOSS, Assistant Examiner

U.S. Cl. X.R.

219—124; 228—13; 248—327